United States Patent
Lanfranchi

(10) Patent No.: US 6,991,085 B2
(45) Date of Patent: Jan. 31, 2006

(54) DEVICE FOR AUTOMATICALLY ADJUSTING MEANS FOR VERTICALLY DIRECTING AND ALIGNING PLASTIC CONTAINERS IN AN DIRECTING-ALIGNING MACHINE

(75) Inventor: Mario Lanfranchi, Parma (IT)

(73) Assignee: Lanfranchi S.R.L., Collecchio (IT)

( * ) Notice: Subject to any disclaimer, the term of this patent is extended or adjusted under 35 U.S.C. 154(b) by 0 days.

(21) Appl. No.: 10/488,962

(22) PCT Filed: Mar. 4, 2003

(86) PCT No.: PCT/EP03/02195

§ 371 (c)(1),
(2), (4) Date: Mar. 9, 2004

(87) PCT Pub. No.: WO03/078284

PCT Pub. Date: Sep. 25, 2003

(65) Prior Publication Data

US 2005/0067255 A1    Mar. 31, 2005

(30) Foreign Application Priority Data

Mar. 20, 2002  (IT) .......................... PR2002A0012

(51) Int. Cl.
*B65G 47/24* (2006.01)
(52) U.S. Cl. .................. 198/396; 198/397.02; 198/443
(58) Field of Classification Search ................ 198/396, 198/397.01, 397.02, 443, 444
See application file for complete search history.

(56) References Cited

U.S. PATENT DOCUMENTS

| | | | | | |
|---|---|---|---|---|---|
| 3,887,062 | A | * | 6/1975 | Bushman | 198/443 |
| 3,948,386 | A | * | 4/1976 | Nalbach | 198/396 |
| 4,825,995 | A | * | 5/1989 | Nalbach | 198/396 |
| 5,400,893 | A | * | 3/1995 | Spatafora | 198/396 |
| 5,996,768 | A | * | 12/1999 | Boyce et al. | 198/397.01 |
| 6,098,781 | A | * | 8/2000 | Lanfranchi | 198/396 |
| 6,302,258 | B1 | * | 10/2001 | Verona | 198/392 |

FOREIGN PATENT DOCUMENTS

| WO | WO 99 59904 | 11/1999 |
|---|---|---|
| WO | WO 01 40084 | 6/2001 |

* cited by examiner

Primary Examiner—James R. Bidwell

(74) Attorney, Agent, or Firm—Young & Thompson

(57) ABSTRACT

Device for automatically adjusting vertically directing and aligning means in dependence on said containers size. The directing means are formed by a plurality of cradles (5) and the aligning means are formed by a corresponding plurality of discharge channels (6), both means are provided with movable parts (10, 35), respectively, adjustable in dependence on plastic containers size. The device provides at least one control member located on the machine outer stationary cylindrical wall (3) and adapted to engage movable parts (10, 35) of cradles and discharge channels, respectively, while the inner hopper holding bulk plastic containers rotates. Movable parts (10, 35) respectively, act on a movable fin (26) that adjusts the cradle cross-section and a movable rear wall or back (33) of the discharge channel.

7 Claims, 4 Drawing Sheets

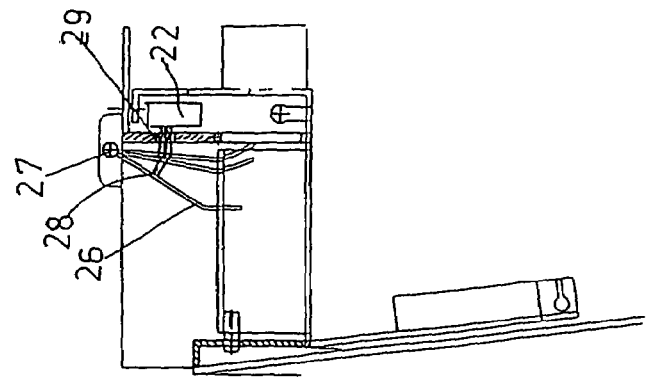
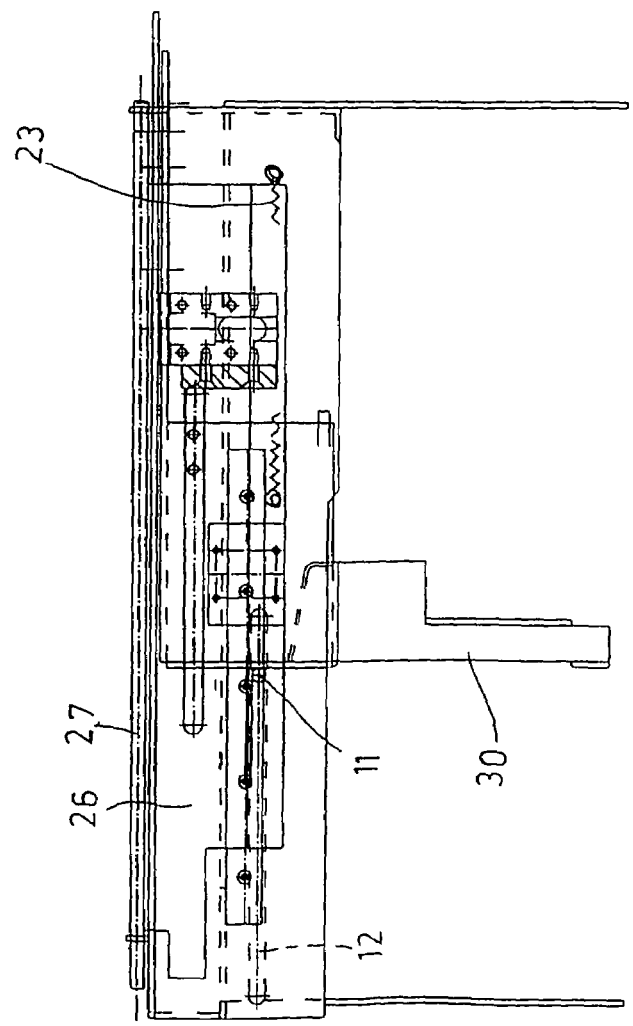

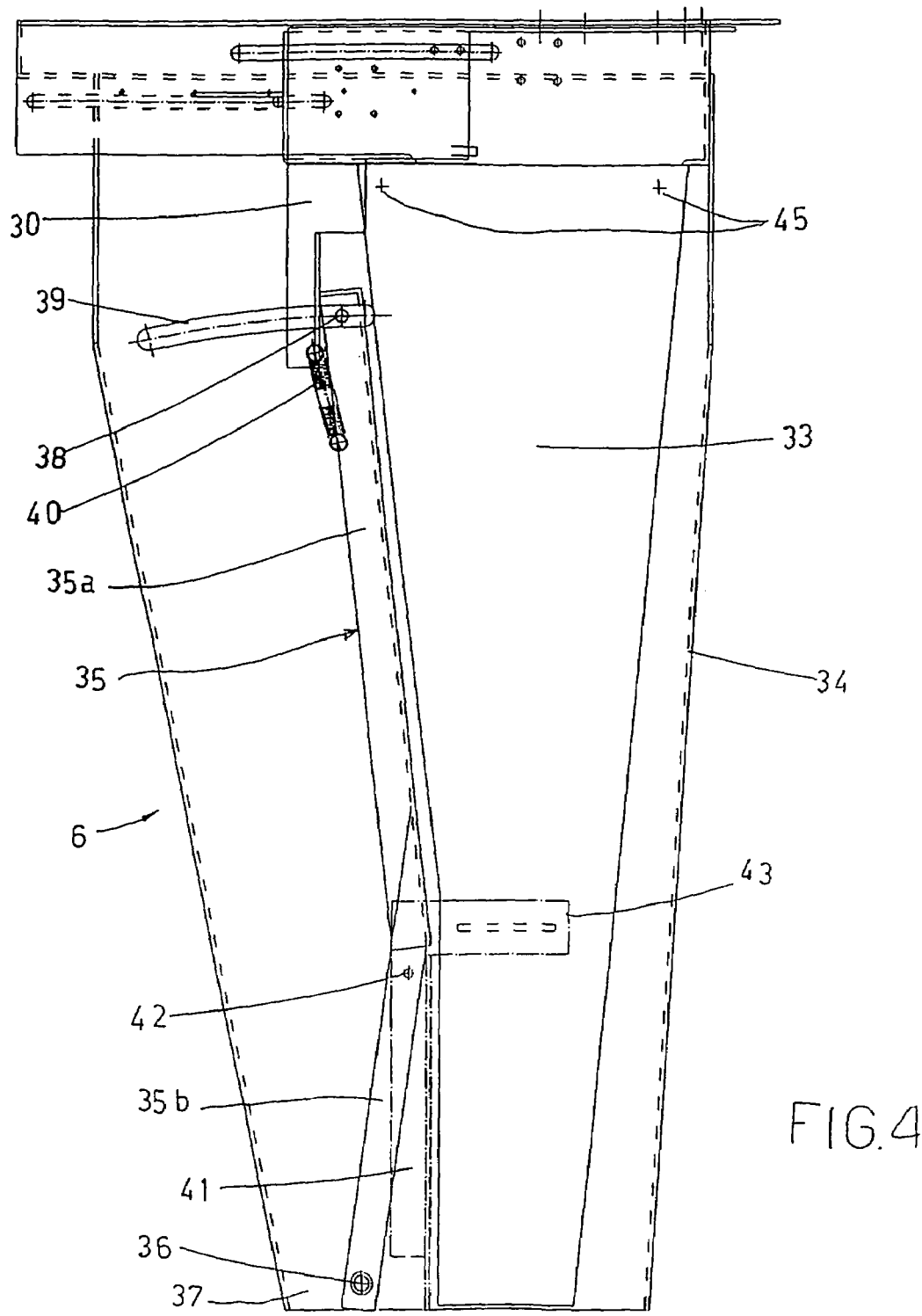

DEVICE FOR AUTOMATICALLY ADJUSTING MEANS FOR VERTICALLY DIRECTING AND ALIGNING PLASTIC CONTAINERS IN AN DIRECTING-ALIGNING MACHINE

The subject matter of the present invention is an universal device for automatically adjusting means for directing and aligning plastic containers in a directing-aligning machine for feeding a packaging or bottling line.

Directing-aligning machines of the present specification comprise a cylindrical receptacle or hopper holding flung about plastic containers.

The hopper inside is provided with means for horizontally carrying containers or bottles on the hopper upper edge to be discharged in a plurality of bottom-opened cradles or trays provided with bars for holding their necks and other bars for holding their bottoms, their longitudinal dimension being substantially equal to the bottles height.

There are number of said means for horizontally moving bottles on the hopper upper edge: the most common means comprise a stationary helical guide arranged adjacent to the hopper, and vanes integral with the hopper are provided between the helical guide and the hopper to be rotated, such as the means means are described in patent EP 374107.

Preferably, the hopper is provided with a conical bottom which can be stationary or rotating.

In another kind of machine, said means are formed by a plurality of elevators located between the inside wall and the conical bottom of the rotating hopper, said elevators rotating in association with the hopper, as described and shown in Italian patent No. 1.253.395.

In other kinds of machines, the hopper bottom is flat and tilted and is rotatable around its tilted axis, see patent U.S. Pat. No. 4,130,194, the hopper receiving a rotating tilted disk peripherally provided with a plurality of cradles.

Any directing-aligning machines have the capability of substituting more or less rapidly the directing and/or aligning means in dependence on the container size, anyway said machines require a human operator as described in patent IT 11759699.

The capability of adjusting cradles and discharge channels size by moving some of the walls forming cradles and discharge channels is shown in already known machines, such those described in patents UK 1558379 and EP 65866.

The adjustment of these machines is also manual and time consuming.

Devices and systems for automatically adjusting directing machines and aligning machines are already known, such as the devices described in international patents WO 99/59904 and WO 01/40084.

The system described in patent WO 99/59904 is very complicated despite the fact is capable of automatically interchanging cradles and discharge channels of different size and it can be used only with machines without hoisting systems, such as elevators, helical guides, or thrust vanes in their hoppers.

In addition, existing machines already provided with interchangeable cradles and discharge channels can not be provided with said systems.

Another disadvantage of the automatic size interchanging system of both patents WO 99/59904 and WO 01/40084 consists in the deformation of one of the cradles or channels adjusting means, said deformation can stops the automatic size interchange system because the size change is simultaneously done in the whole machine.

The same applicant was capable to overcome the above mentioned disadvantages by embodying a very simple device that is able to rapidly change the discharge channels and cradles size and can be fitted on existing machines on the market. However, the applicant's adjustment was dependent only on the container height and was not dependent on the maximum size or cross-section thereof. Another object is the possibility to accomplish the size change in presence of a discharge channel damaged by a warped bottle jammed in it.

Another object consists of changing the discharge channels and cradles size both in dependence on the container height and maximum size or cross-section.

The technical problem solved by the present invention consists in controlling slidable or at least movable components of cradles and discharge channels by one or more control members located in one or more positions on the hopper or on its stationary cylindrical wall so that, on the machine rotation said control member will engage the movable components of said cradles and/or discharge channels. All the movable parts both of a cradle and an underlying discharge channel are mechanically connected to each other so that just one command causes the adjustment of the movable parts.

These and other objects are achieved by a foodstuff conveying apparatus in an universal device for adjusting means vertically directing and aligning plastic containers in a directing-aligning machine, object of the present invention, characterized by the subject matter of the following claims particularly by the fact, besides of providing at least on control member located on the machine outer stationary cylindrical wall and adapted to engage the movable components of cradles and discharge channels during the rotation of the inner hopper holding bulk plastic containers, each cradles is provided with a fin hinged to one of the two longitudinal walls of the cradle and adapted to rotate with the movement of the movable component of the cradle to a position inside the same cradle reducing as a result its cross-section size.

Each discharge channel of the device is provided with a rear wall or back movable outwardly the machine.

These and other features will be apparent by the following specification of a preferred embodiment shown in a non-limiting and illustrative way in the attached drawing, wherein:

FIG. 2 is a front view of the device specifically showing the cradle,

FIG. 3 is a side view of the device specifically showing the cradle,

Figure 5:
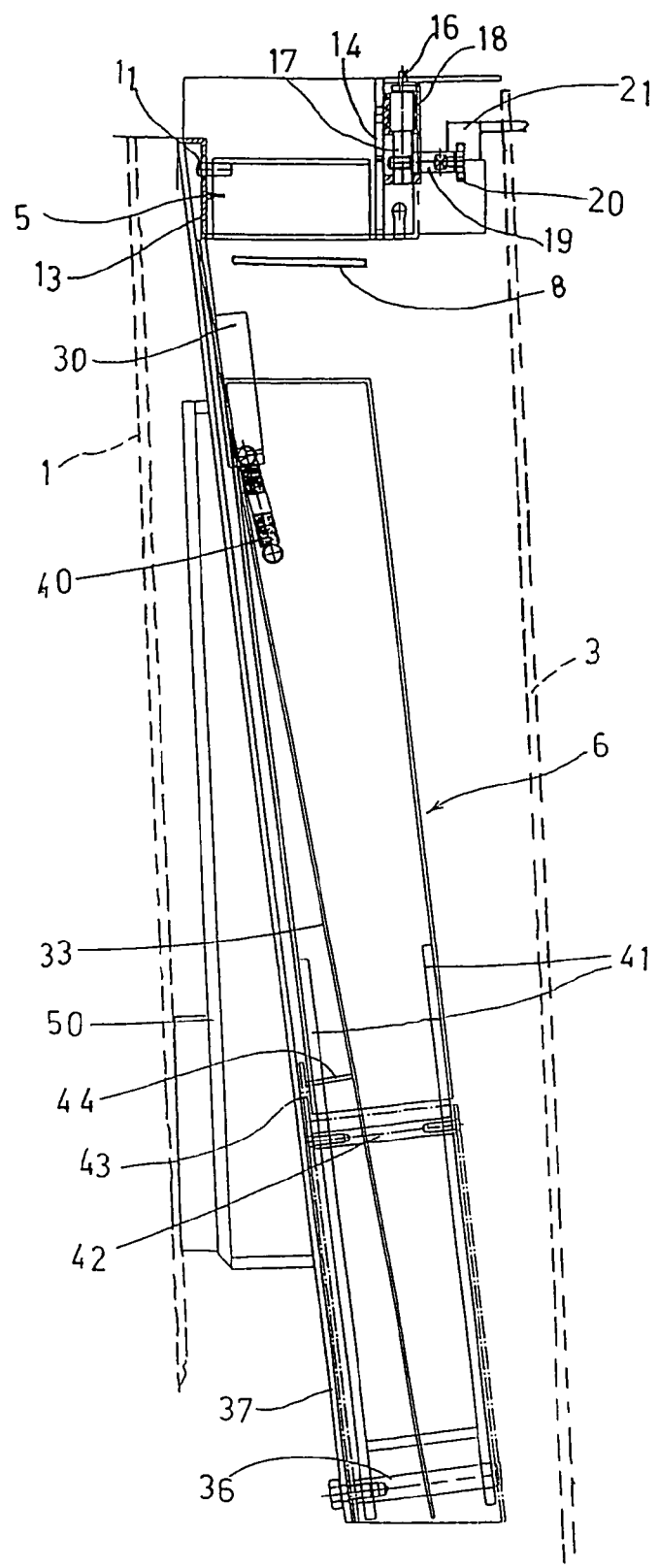

FIG. 4 is front view of the device from the inner side of the machine, particularly of the discharge channel, FIG. 5 is side view of a discharge channel, Referring to figures, 1 is an inner rotating wall of a cylindrical receptacle or hopper holding bulk plastic containers 2 of a directing-aligning machine whose raising means consisting for example in vertically reciprocating elevators are not shown. 3 is a outer stationary cylindrical wall concentric to the inner rotating wall, an annular chamber defined between said walls contains cradles 5 and discharge channels 6. Control members of the automatic adjusting device, not shown, are located on the fixed outer cylindrical wall.

A number of cradles 5 adapted to horizontally receive plastic bottles 2 and an equal number of discharge channels 6 adapted to vertically hold and align said bottles dropped in the cradles are connected to the outer side of the inner rotating wall.

Cradles and discharge channels can be divided or joined, as shown, between cradles and channels there is flat partition wall 8 terminating where a container drops from a cradle into a channel.

Figure 1:
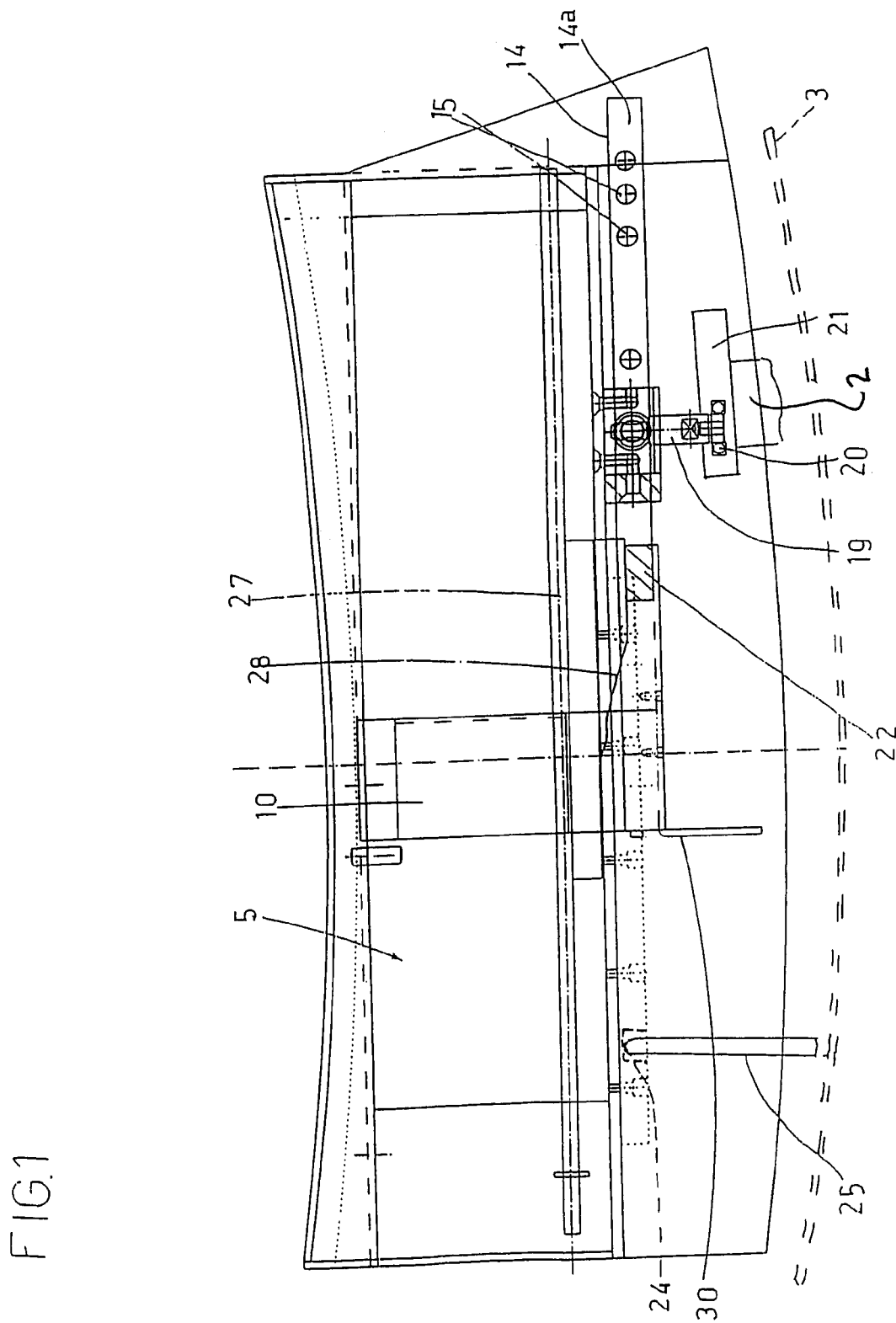
FIG. 1 is a top plan view of the device.

Referring to FIGS. 1, 2 and 3, cradle 5 consists of four side stationary walls forming a opened-bottom parallelepiped receiving a movable slide 10 provided with a pin 11 slidable in a slot 12 made in a bracket 13 integral with a bottom portion which will be described hereinafter.

The means for vertically directing the bottles are formed by the movable slide and cradle.

A plurality of holes 15 made in the horizontal side 14a of a bracket 14 integral with the movable slide 10 can receive a finger 16 elastically biased by a spring 18. Finger 16 is supported by a vertical cylinder 17, a pin 19 fixed to the vertical cylinder 17 supports a roller 20 adapted to engage a shaped cam or slide 21 carried by a stem of an air piston (not shown) integral with the outer side of the outer stationary cylinder.

A spring 23 is fixed between the movable slide and the cradle stationary part so that said slide, once disengaged by the finger, moves to the stop on the cradle right side.

A vertical slot 24 made in the vertical wall of the bracket 14 receives a wedge 25 provided with a horizontal axis handling system.

Handling system is provided with an brushless motor, not shown.

Referring to FIGS. 1 and 3, the cradle contains a fin 26 integral with a pin 27 hinged to the cradle outer longitudinal wall. As shown in FIG. 3, fin 26 is rotatable in order to reduce the cradle width in dependence on bottle diameter. The fin rotation is determined by the displacement of the movable slide 10 by cam 28 integral with fin 26.

Cam 28 entering a slot 29 defined in wall 14 and engages a block 22 integral with movable slide 10.

According another embodiment, not shown, cam 28 is integral with block 22.

As shown in FIGS. 2 and 3, movable slide is integral with a connecting element 30 for effecting the size change of a discharge channel. Referring particularly to FIGS. 4 and 5, a discharge channel will be described that consists of a movable vertical rear wall or back 33 and a pair of tilted walls 34 and 35 forming a downwardly-directed funnel.

Wall 34 is stationary while wall 35 is subdivided into two rotating portions 35a and 35b hinged on a pin 36 in order to change its tilt to the vertical axis.

Pin 36 is fixed to the stationary wall 37 and the wall 35 rotation widens or shrinks the discharge channel entrance, its exit staying unchanged.

Portion 35a of movable wall 35 is driven at the top by a pin 38 integral with the movable vertical wall, and slidable in a slot 39 made in rear wall. Movable vertical wall is kept against the connecting element 30 by a spring 40 in this way the connecting element movement causes the rotation of said vertical wall.

The C-shaped box lower portion 35b receives a fork 41 having a pin 42 which is the rotation axis of box lower portion 35b which in turn carries at the top a flat element 43 which is engaged by a cam 44 integral with the rear movable wall 33. Rear wall 33 is substantially formed by a resilient stainless steel sheet and is fixed at 45 to wall 37 so that is pressed on cam 44.

The outer portion of rear wall with respect to the discharge channel is supported by a frame 50 that connects the whole discharge channel and the respective overhead cradle to the outer side of the rotating inner wall 1.

In the following the operation of the device assisted by a processor will be described.

The human operator must only select by the processor the size of bottles to be introduced in bulk in the machine.

Upon this selection, the vertical directing means and aligning means will be completely and automatically adjusted while the inner rotating cylinder rotates one turn according to the following sequence.

A photocell located in the cradles path will starts the cycle which first of all comprises the operation of an air cylinder driving cam-shaped slide 20 in engagement with roller 19 and then, upon machine rotation, finger 16 will be lowered to exit one of holes 15 allowing movable slide 10 to freely move on the cradle right side by spring 22 bias to a stop where pin 11 abuts the slot 12 end.

In this position, the horizontal axis handling system will align the wedge with the vertical slot defined in the vertical wall of bracket 14 integral with the movable slide. Thereafter the wedge will enter the slot.

The handling system, by the brushless motor, will horizontally move the movable slide to a selected location where it stops by inserting finger 16 in a hole 15 corresponding to said location.

The rotation of movable fin 26 caused by the movable slide 10 through cam 28, shrinks the cradle cross-section. At the same time, connecting element 30 will cause the discharge channel wall 35 mechanically connected to said movable slide to move with the outwardly displacement of discharge channel rear wall 33.

In this way the adjustment of a cradle and a discharge channel has been accomplished, said adjustment can be made locating only the movable slide 10. Continuing the machine rotation, the following cradle with its respective discharge channel will arrive in front of the driving elements outside the machine, therefore a new operation cycle can be started that is similar to the prior cycle. The machine adjustment depending on the plastic container size particularly depending on the height and maximum size of container cross-section, will be made every its complete turn when the adjustment device, being in a stationary location, will have adjusted all the cradles movable parts and consequently the discharge channels.

During the adjustment, the machine rotation could be continuous or step-by-step for each discharge channel.

From the description it is apparent that the above discussed device could be easily used with any kind of machine with both a helical guide or elevator-type bottle selection-elevation system and a disk-type selection system having a rotation axis tilted to the vertical, this system has been called universal because it can be used with every kind of machine with cradles and discharge channels moving for example along a circular or substantially circular path.

From the description it is apparent that the device can be easily used with machines provided with cradles and discharge channels without adjusting systems because the control member is located outside the machine on a stationary part of the machine; obviously cradles and channels must be substituted with the ones described, the substitution being fast and easier in that cradles and channels are integral in the illustrated example.

Said devices could be more than one for a quicker adjustment, for example by two devices, the adjustment will be automatically completed after a machine rotation of 180°.

Reference has been specifically made to a vertical axis machine with a cylindrical rotating bin receiving bulk plastic containers or bottles, however the device, since it is universal, can be used with a tilted axis machine provided with two disks rotating around said tilted axis, the upper one peripherally carrying a plurality of cradles, while the discharge channels are connected between the upper and lower disks.

Control members can be always stationary and integral with an outer stationary housing surrounding the disks, said housing being the bin receiving bulk containers.

What is claimed is:

1. Universal device for automatically adjusting plastic containers vertically directing and horizontally aligning means in a directing-aligning machine, said machine comprising: a substantially cylindrical receptacle holding bulk plastic containers, comprising a rotating cylindrical wall, to the outer cylindrical wall a plurality of cradles (5) and a corresponding plurality of discharge channels (6) are fixed, both provided with movable parts (10, 35) which can change their position in dependence on the containers size; a stationary cylindrical wall (3) surrounding cradles and discharge channels, at least one control member located on the machine outer stationary cylindrical wall (3) and adapted to engage cradles (5) movable parts (10) on receptacle rotation, for varying the position of said movable parts in dependence on containers size characterized by the fact it provides:

for each cradle a fin (26) hinged to one of the two cradle longitudinal walls and adapted to rotate on the displacement of the cradle movable part (10) into the same cradle to reduce in this way the cross-section size in dependence on the diameter or largest size of the container cross-section;

for each discharge channel a movable bottom wall (33) located between the tilted side walls (34, 35) for reducing the channel width, the displacement of the bottom wall being controlled by the movable wall (35) for changing the channel depth in dependence on the diameter or the largest size of the container cross-section.

2. Automatic adjusting universal device according to claim 1, characterized by the fact fin (26) is integral with a cam (28) interfering with the movable part of cradle (5).

3. Automatic adjusting universal device according to claim 1, characterized by the fact a cam (28) is integral with the cradle movable part, said cam interfering with fin (26) to rotate it.

4. Automatic adjusting universal device according to claim 1, characterized by the fact the movable part of each discharge channel comprises:

a wall (35), split in two portions (35a, 35b), pivoted at its bottom on a pin (36) for changing its tilt to the vertical axis, the top portion (35a) being directly connected to the cradle movable part (10).

5. Automatic adjusting universal device according to claim 1, characterized by the fact the movable bottom wall (33) is substantially formed by a flexible steel plate fixed on its top to a fixed wall (37) and outwardly pushed by a cam (44) driven by a bottom portion (35b) of wall (35).

6. Automatic adjusting universal device according to claim 1, characterized by the fact that a box-shaped bottom portion (35b) receives a fork (41) provided with a pin (42) acting as a rotation axis for the bottom portion (35b), that in turn supports a flat element (43) engaging cam (44) integral with the bottom wall (33).

7. Universal device for automatically adjusting plastic container vertically directing and horizontally aligning means in a directing-aligning machine, said machine comprising: a bin for holding bulk plastic containers, at least one rotating disk located inside said bin and peripherally supporting a plurality of cradles, said disk having a vertical or tilted rotation axis, a plurality of discharge channels being connected to said disk or between said disk and a lower disk, cradles and discharge channels being provided with movable parts which can vary their position in dependence on the containers size, at least one control member located on the machine outer stationary wall forming the bin, said control member being adapted to engage cradle movable parts on disk/s rotation to change their position in dependence on containers size, characterized by the fact it provides for each cradle a fin (26) hinged to one of the cradle longitudinal walls and adapted to rotate on the displacement of the cradle movable part (10) into the same cradle to reduce in this way the cross-section size in dependence on the diameter or largest size of the container cross-section;

for each discharge channel a movable bottom wall (33) located between the tilted side walls (34, 35) for reducing the channel width, the displacement of the bottom wall being controlled by the movable wall (35) for changing the channel depth in dependence on the diameter or largest size of the container cross-section.

* * * * *